(12) United States Patent
Ji et al.

(10) Patent No.: US 9,900,394 B2
(45) Date of Patent: Feb. 20, 2018

(54) USER-SPECIFIC AND USER-ACTIVITY-BASED ROUTING WITHIN A WEBSITE

(71) Applicant: LinkedIn Corporation, Mountain View, CA (US)

(72) Inventors: Haifeng Ji, San Jose, CA (US); Erica M. Lockheimer, Monte Sereno, CA (US); Peter B. Rusev, San Mateo, CA (US); Muhammad Aatif Awan, Sunnyvale, CA (US); Yang Zhou, San Jose, CA (US); Lili Wu, Palo Alto, CA (US); Manas S. Khadilkar, Mountain View, CA (US); Samir M. Shah, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 14/465,622

(22) Filed: Aug. 21, 2014

(65) Prior Publication Data
US 2015/0350354 A1    Dec. 3, 2015

Related U.S. Application Data

(60) Provisional application No. 62/005,861, filed on May 30, 2014.

(51) Int. Cl.
*G06N 5/02* (2006.01)
*H04L 29/08* (2006.01)
*H04L 12/18* (2006.01)

(52) U.S. Cl.
CPC .............. *H04L 67/22* (2013.01); *H04L 67/02* (2013.01); *H04L 67/306* (2013.01)

(58) Field of Classification Search
CPC .......... G06F 15/16; G06F 17/30; G06F 17/28; G06N 5/02; H04L 67/22; H04L 67/02; H04L 67/306; H04L 12/18
(Continued)

(56) References Cited

U.S. PATENT DOCUMENTS 8,200,661 B1 * 6/2012 Pearce .............. G06F 17/30867
  707/721
9,769,107 B2 * 9/2017 Marti ...................... H04L 51/32
(Continued)

*Primary Examiner* — Cesar Paula
*Assistant Examiner* — Jian Huang
(74) *Attorney, Agent, or Firm* — Park, Vaughan, Fleming & Dowler LLP

(57) ABSTRACT

When a user of a social network accepts an invitation message to connect with another user of the social network, a system may use a history of user activity to determine where the user is subsequently directed within the social-network website. In particular, based on the history of user activity associated with an in-network page with recommendations for possible connections for the user within the network of users, the system may determine whether or not there have been too many impressions of the in-network page. If not, the system may present the in-network page with a recommendation for a possible in-network connection for the user within the network of users. Then, if the system receives a user selection of the possible in-network connection, the system may provide an invitation message inviting the possible in-network connection to connect with the user by activating a link in the invitation message.

17 Claims, 7 Drawing Sheets

(58) Field of Classification Search
USPC .......................................... 715/205; 705/50
See application file for complete search history.

(56) References Cited

U.S. PATENT DOCUMENTS

| | | | | |
|---|---|---|---|---|
| 2008/0147482 A1* | 6/2008 | Messing | ................ | G06Q 30/02 |
| | | | | 705/14.53 |
| 2008/0250450 A1* | 10/2008 | Larner | ................ | G06Q 30/0256 |
| | | | | 725/34 |
| 2009/0192871 A1* | 7/2009 | Deacon | ................. | G06Q 10/00 |
| | | | | 705/319 |
| 2011/0320276 A1* | 12/2011 | Ray | .................... | G06Q 30/0255 |
| | | | | 705/14.53 |
| 2013/0073389 A1* | 3/2013 | Heath | .................... | G06Q 50/01 |
| | | | | 705/14.54 |
| 2014/0129505 A1* | 5/2014 | Lin | ........................ | G06Q 50/01 |
| | | | | 706/50 |

* cited by examiner

USER-SPECIFIC AND USER-ACTIVITY-BASED ROUTING WITHIN A WEBSITE

CROSS-REFERENCE TO RELATED APPLICATION

This application claims priority under 35 U.S.C. § 119(e) to U.S. Provisional Application Ser. No. 62/005,861, entitled "User-Activity-Based Routing Within a Website," by Haifeng Ji, Erica Lockheimer, Peter Rusev, Aatif Awan, Yang Zhou, Lili Wu, Manas Khadilkar and Samir M. Shah, filed on May 30, 2014, the contents of which are herein incorporated by reference.

This application is related to U.S. Non-provisional application Ser. No. 14/056,777, entitled "Site-Flow Optimization," by Samir M. Shah, Lili Wu, and Manas Khadilkar, filed on Oct. 17, 2013, the content of which are herein incorporated by reference.

BACKGROUND

Field

The described embodiments relate to techniques for routing a user within a website. More specifically, the described embodiments relate to techniques for routing the user to different web pages within the website based on a history of user activity and one or more user-experience criteria.

Related Art

Social networks are an increasingly popular format for aggregating and interconnecting individuals who have similar interests. For example, a website may provide a professional social network for individuals in the workforce. These users may 'connect' with each other, thereby defining subsets of interrelated users in the social network. In principle, these interrelated users can facilitate a wide variety of value-added services, such as helping: the users find employment, employers recruit employees, educational institutions identify prospective students, etc. More generally, the interrelated users in a social network may facilitate targeted communication among the users.

In practice, in order to optimally achieve these capabilities, a social network typically needs to have a minimum size (i.e., a minimum number of users and/or a minimum number of interrelated users). Furthermore, the quality of the value-added services provided via a social network is usually increased as the number of users and the number of interrelated users in the social network increases. Consequently, a provider of the social network typically wants to increase the number of users and their interrelationships in the social network.

One approach for growing the size of the social network (i.e., adding more users) is to provide invitation messages. For example, invitation messages to connect with a user may be provided to other users in the social network and/or individuals who are not currently users of the social network. Note that the former are sometimes referred to as 'in-network people,' and the latter are sometimes referred to as 'out-of-network people.' In addition, note that invitation messages provided to the in-network people are sometimes referred to as 'member-to-member invitations,' and invitation messages provided to the out-of-network people are sometimes referred to as 'member-to-guest invitations.'

Typically, potential in-network or out-of-network people who may be possible connections for the user are displayed to the user. Then, if the user selects one of the possible connections, an invitation message (such as an email) is provided to the possible connections. If this individual accepts the invitation (e.g., by activating a link included in the invitation message), they will be 'connected' or interrelated with the user in the social network if they already use the social network or they will be invited to join the social network if they do not already use the social network.

However, this process poses several challenges. Notably, the user may become bored after repeatedly viewing lists of possible connections. In particular, user fatigue and the relevance of the possible connections may, over time, reduce user interest in selecting possible connections, which may reduce the number of invitation messages that are provided (and, thus, may constrain the number of interrelated users and/or the number of users in the social network).

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
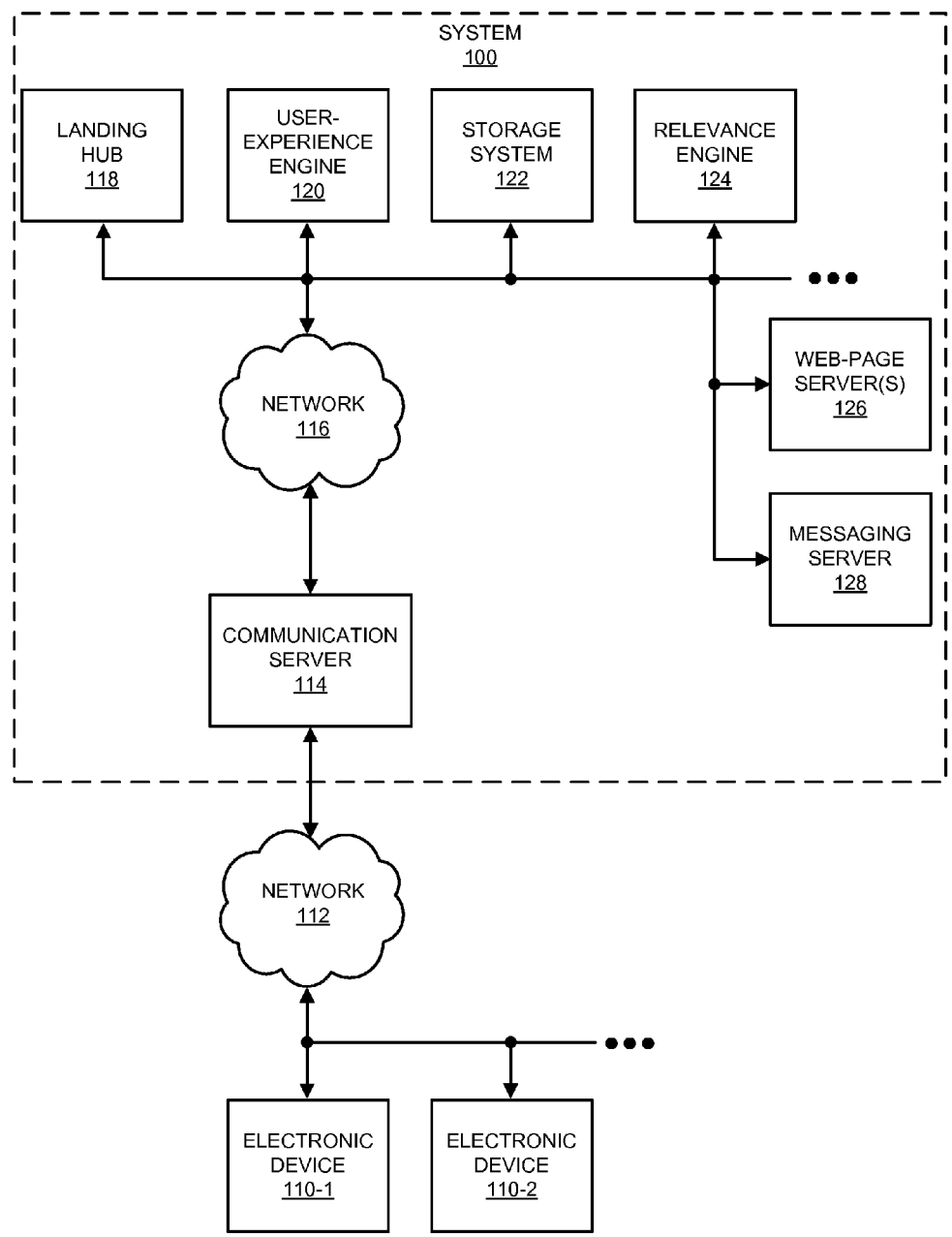
FIG. 1 is a block diagram illustrating a system that provides invitation messages in accordance with an embodiment of the present disclosure.

Embodiments of a system and a technique for providing an invitation message for use with the system are described. When a user of a social network accepts an invitation message to connect with another user of the social network, the system may use a history of user activity and one or more user-experience criteria (which may assess freshness of the information presented to the user, such as a number of impressions of the information, user action in response to the information, variation in user behavior during a time interval, etc.) to determine where to direct the user within the social-network website. In particular, based on the history of user activity associated with an in-network page (such as a web page) with recommendations for possible connections for the user within the network of users (which are sometimes referred to as 'in-network connections'), the system may determine whether or not the one or more user-experience criteria have been met (e.g., has the user been served a sufficient number of impressions of a particular in-network page).

If not, the system may present the in-network page with a recommendation for one or more possible in-network connections for the user within the network of users. Then, if the system receives a user selection of a recommended in-network connection, the system may provide an invitation message inviting the selected in-network connection to connect with the user by activating a link in the invitation message.

Alternatively, if the one or more user-experience criteria are satisfied or achieved, the system may select a page to present to the user, from a set of candidate pages, based on a predetermined supervised-learning model that predicts relevance of the set of pages to the user based on the history of user activity and/or a user profile. For example, the selected page may have a maximum relevance for the user at a given time. Then, the system may present the selected page to the user. In some embodiments, the system imports an address of an individual (who is currently outside of the network of users) that communicated with the user using a communication protocol (such as email). Moreover, the system may present an out-of-network page with a recommendation for a possible out-of-network connection for the user outside of the network of users (which is sometimes referred to as an 'out-of-network connection'). Furthermore, if the system receives a user selection of the possible out-of-network connection, the system may provide an invitation message inviting the possible out-of-network connection to become a user of the system and possibly connect with the user by activating a link in the invitation message. Alternatively or additionally, the set of pages may include a home page for the user and/or a profile-editing page for the user.

In this way, the system may allow the number of users and/or the number of interrelated users (i.e., users who are connected to each other) in the social network to increase over time. In particular, the system may ensure that the pages (such as the in-network page or the out-of-network page) that the user views at a given time are interesting, do not become tedious or overly repetitive, and that the recommendations for possible in-network and/or out-of-network connections are relevant. This capability may increase the value of value-added services provided via the social network. Thus, this communication technique may increase: the quality of the user experience, and/or user satisfaction and retention.

In the discussion that follows, an individual or a user may include a person (for example, an existing user of a social network, a new user of the social network, an individual who does not currently use the social network, etc.). More generally, the communication technique may be used by an organization, a business and/or a government agency. Furthermore, a 'business' should be understood to include for-profit corporations, non-profit corporations, groups (or cohorts) of individuals, sole proprietorships, government agencies, partnerships, etc.

We now describe embodiments of the system and its use. FIG. 1 presents a block diagram illustrating a system 100 that performs the communication technique. In this system, users of electronic devices 110 may use a software product, such as instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed and that executes on electronic devices 110).

Using one of electronic devices 110 (such as electronic device 110-1) as an illustrative example, a user of electronic device 110-1 may use the software application to interact with other users in a social network (and, more generally, a network of users), such as a professional social network, that facilitates interactions among the users. As described further below with reference to FIG. 5, the interactions among the users may specify a social graph in which nodes correspond to the users and edges between the nodes correspond to the users' interactions, interrelationships, and/or connections. Note that each of the users of the software application may have an associated user profile that includes personal and professional characteristics and experiences (such as education, employment history, demographic information, work locations, etc.), which are collectively referred to as 'attributes' in the discussion that follows.

While the users of electronic devices 110 are using the software application, communication server 114 may provide content to one or more of electronic devices 110 via network 112. For example, the content may include an invitation message with an invitation to connect with another user of the social network, which may be termed a member-to-member invitation. (In the discussion that follows, an 'invitation' or an 'invitation message' may include a verbal, written, or recorded communication sent to or left for a recipient with an invitation to connect with another user of the social network.) In particular, the invitation message may be an email that includes a link and that is addressed to the user of electronic device 110-1. (Note that the email may be communicated via the software application or may be communicated to a separate email application that executes in the environment of electronic device 110-1.) If the user activates this link (e.g., by clicking on the link using a mouse, touching a virtual icon associated with the link in a user interface, etc.), information indicating activation of the link, and thus acceptance of the invitation, may be communicated, via network 112, to communication server 114.

This information may be provided to landing hub 118 via network 116 (which is associated with system 100). In response, landing hub 118 may have user-experience engine 120 determine if at least one user-experience criterion is satisfied or achieved based on a history of user activity during a time interval (such as one week, two weeks, a month, etc.). In particular, user-experience engine 120 may access, via network 116, data in the history of user activity in a data structure (which is stored in a computer-readable memory, such as storage system 122 that may encompass multiple devices, i.e., a large-scale storage system). Note that the history of user activity may be associated with viewing and/or interaction with an in-network page (such as a web page in a website for the social network) with recommendations for possible in-network connections for the user within the social network. Moreover, the in-network page may be hosted by one of web-page servers 126.

For example, the at least one user-experience criterion may include: a number of views of impressions of the in-network page greater than a threshold value (such as two views within two weeks); a number of user actions associated with an out-of-network page (described below) greater than another threshold value (such as the user already viewing the out-of-network page once during the time interval); and/or time variation in user behavior. In particular, the time variation in the user behavior may be associated with a day of the week, a time of year, or some other time period. In an exemplary embodiment, the user may prefer to view the out-of-network page: on Tuesdays or Wednesdays (or other specific day(s)), at certain times of the month, and/or at certain times of the year (e.g., there may be a seasonal variation in the user's viewing preferences). Thus, user-experience engine 120 may compare data in the history of user activity to one or more threshold values to determine if the one or more user-experience criteria are achieved. For example, for each of the pages in a set of multiple pages, user-experience engine 120 may compare the number of views of the page to a corresponding view threshold value. Alternatively or additionally, for one or more of the multiple pages, user-experience engine 120 may compare the number of user actions with the one or more pages to a corresponding action threshold value. In addition, user-experience engine 120 may compare the variation in the behavior of the user to a behavior threshold value.

If the at least one user-experience criterion is not achieved, landing hub 118 may, via network 116, instruct one of web-page servers 126 to present or provide the in-network page with recommendations of one or more other users in the network of users as possible new in-network connections for the user. For example, one of web-page servers 126 may communicate the in-network page (or information specifying the in-network page) via network 112 to electronic device 110-1. Then, the in-network page may be displayed on electronic device 110-1 using a web browser and/or within the software application. Moreover, if the user selects a recommended in-network connection with another user (e.g., by clicking on it with a mouse, touching an associated virtual icon in a user interface), this selection may be communicated, via network 112, to communication server 114. In response, communication server 114 may instruct messaging server 128 to provide, via network 112, an invitation message (i.e., a member-to-member invitation) to another of electronic devices 110 (such as electronic device 110-2) that is associated with the other user. This invitation message may invite the other user to form a new in-network connection with the user by activating a link in the invitation message.

Alternatively, if the at least one user-experience criterion is achieved, landing hub 118 may cause relevance engine 124 to select a page to present to the user (such as another web page in the website for the social network), from a candidate set of pages, based on a predetermined supervised-learning model that predicts relevance of the set of pages to the user based on the history of user activity and a user profile for the social network (which collectively are sometimes referred to as 'features'). For example, relevance engine 124 may access a user profile stored in a data structure (which is stored in storage system 122), via network 116, to facilitate the selection. Note that the selected page may have a maximum relevance for the user. Moreover, note that the set of pages may be hosted by another one of web-page servers 126. Furthermore, after the page is selected, landing hub 118 may, via network 116, instruct the associated one of web-page servers 126 to provide the selected page to the user. In particular, the instructed web-page server may, via network 112, present or provide the selected page (or information specifying the selected page) to electronic device 110-1. Then, the selected page may be displayed on electronic device 110-1 using a web browser and/or within the software application.

In an exemplary embodiment, the set of pages includes two or more pages. For example, the set of pages may include: a home page for the user in the social network, a profile-editing page for the user, the in-network page, and/or an out-of-network page. Illustratively, the out-of-network page may include one or more recommendations for possible new out-of-network connections for the user (e.g., with people outside of the social network). An out-of-network connection may be identified by a web-page server 126 by importing addresses of one or more individuals (who are not users of the social network) that communicated with the user using a communication method such as electronic mail, Short Message Service, and/or telephone.

Furthermore, if the user selects a recommended or possible out-of-network connection (e.g., by clicking on it with a mouse, touching an associated virtual icon in a user interface, etc.), this selection may be communicated, via network 112, to communication server 114. In response, communication server 114 may instruct messaging server 128 to provide, via network 112, an invitation message (i.e., a member-to-guest invitation) to yet another of electronic devices 110 that is associated with the selected possible out-of-network connection. This invitation message may invite the possible out-of-network connection to connect with the user by activating a link in the invitation message.

By selectively presenting or providing different pages in system 100 to the user, system 100 may help prevent fatigue when viewing potential in-network or out-of-network connections, and/or may increase the relevance of the potential in-network or out-of-network connections. This capability may increase the number of invitation messages that are issued by messaging server 128. Therefore, system 100 may increase the number of connections and/or the number of users in the social network. Furthermore, system 100 may offer improved service to the users and advertisers, in the form of more effective advertisements (which are presented to the users of the social network), recommendations, employment opportunities, and/or interesting content. Consequently, the communication technique implemented in system 100 may increase the satisfaction both users and advertisers.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 2:
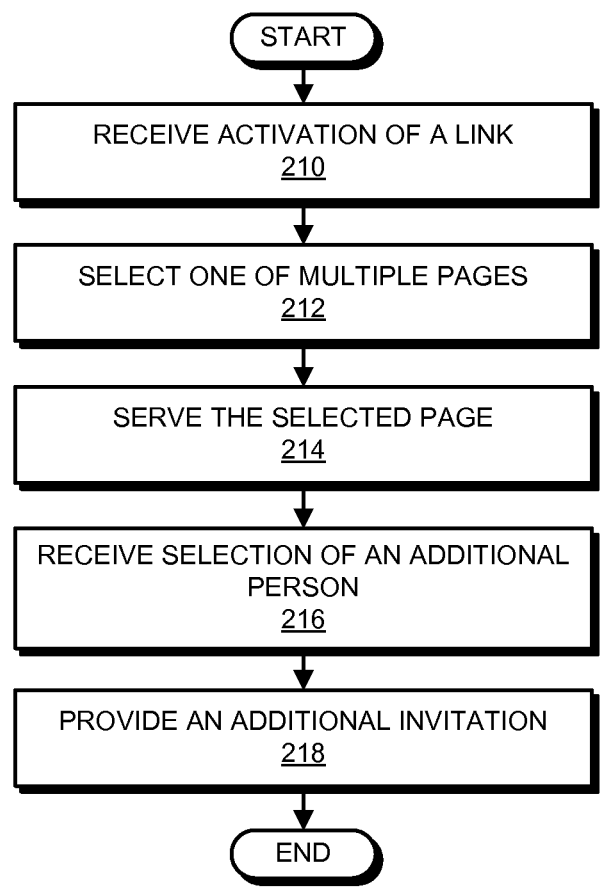
FIG. 2 is a flow chart illustrating a method for providing an invitation message in accordance with an embodiment of the present disclosure.

We now describe embodiments of the communication technique. FIG. 2 presents a flow chart illustrating a method 200 for providing an invitation message, which may be performed by a computer system (such as system 100 in FIG. 1 or computer system 600 in FIG. 6). During operation, the computer system receives, from an electronic device operated by a first user, activation of a link (operation 210) in an invitation delivered to the first user, where the invitation is an invitation to connect with a second user in a network of users of the computer system.

Then, the computer system selects, based on a history of user activity during a time interval (such as two weeks), one of multiple pages (operation 212) to serve to the first user in response to activation of the link, where each of the multiple pages facilitates connections with additional people. For example, the history of user activity may include: a number of views of each of the multiple pages; a number of user actions with the multiple pages; and/or variation in user behavior during the time interval. Thus, when selecting a page the computer system may, for each of the multiple pages, compare the number of views of the page to a corresponding view threshold value and compare the number of user actions with the page to a corresponding action threshold value, and may also compare variation in the behavior of the first user to a behavior threshold value.

For example, if the number of views of an in-network page (which allows the first user to send invitations to other users within the network so that they can connect with the first user) is less than three, a user-experience criterion may not be deemed met, and the computer system may select the in-network page. Alternatively or additionally, if the first user has already viewed an out-of-network page (which allows the user to solicit identified individuals outside of the network of users so that they can join the network and connect with the first user), then another page (such as a home page or a profile-editing page) may be selected. Note the selection may also be based on a predetermined variation in user behavior as a function of time. Consequently, on certain days of the week (such as Tuesday or Wednesday), when the first user is less busy and, therefore, more receptive to possible connections outside of the network, the computer system may select the out-of-network page.

When one or more of the threshold values is triggered, the computer system may select one of the multiple pages by executing a predetermined supervised-learning model that predicts relevance of the multiple pages to the first user based on the history of user activity and a user profile of the first user, where the selected page has a maximum relevance for the first user. For example, the supervised-learning model may predict the user response to different pages based on covariates w, such as: features or attributes in the user profile, user behavior, user demographics, and/or connections in the network of users. Illustrative features may include: user covariates (such as age, gender, industry, title, etc.), page covariates (such as the page-response rates), contextual flow (such as when pages are viewed and how long the pages are viewed), the user location, and/or interactions between the covariates. Then, given covariates w and visits in a flow x, the computer system may select page y in set of pages (or possible actions z), and look at the predicted user response $Y_{wxyz}$ (such as the probability of a click through or, in other words, whether the user is likely to select a possible connection). Note that the selected page y may be the one with the highest predicted user-response rate and/or business value. In an exemplary embodiment, the supervised-learning model is trained using L1 regularization (such as Lasso) with tens to hundreds of millions of observations and hundreds of thousands to millions of covariates. The supervised-learning model may use logistic regression to select the page y with the maximum relevance.

Moreover, the computer system serves the selected page (operation 214) to the electronic device.

Next, the computer system receives, from the electronic device, selection of an additional person (operation 216) to whom the first user is not connected in the network. For example, if the in-network page is displayed, the selected additional person may be an existing member of the network (i.e., a possible connection within the network). Alternatively, if the out-of-network page is displayed, the selected additional person may be outside of the network (e.g., a possible connection with a guest who may join the network if they accept an invitation message to connect with the user).

Furthermore, the computer system provides, to an electronic device associated with the additional person, an additional invitation (operation 218) to join the network (if the additional person is not in the network) or to connect with the first user (if the additional person is in the network). Thus, the additional invitation may include a member-to-guest invitation or a member-to-member invitation.

In this way, the communication technique can ensure that the page displayed to the first user is fresh and relevant, or at least that it is not served so frequently that the user ignores it. This approach may prevent user fatigue and may thus help increase the number of invitation messages that are provided (based on selections by the first user) and/or accepted. Consequently, the communication technique may improve the social network by increasing the number of connections or interrelationships between the users in the social network and/or by increasing the number of individuals who join the social network.

In some embodiments of method 200, there may be additional or fewer operations. For example, prior to serving the out-of-network page, the computer system may import addresses of one or more individuals who communicated with the first user using a communication protocol such as: an email, a Short Message Service message, and/or a telephone communication protocol. Moreover, the order of the operations may be changed, and/or two or more operations may be combined into a single operation.

Figure 3:
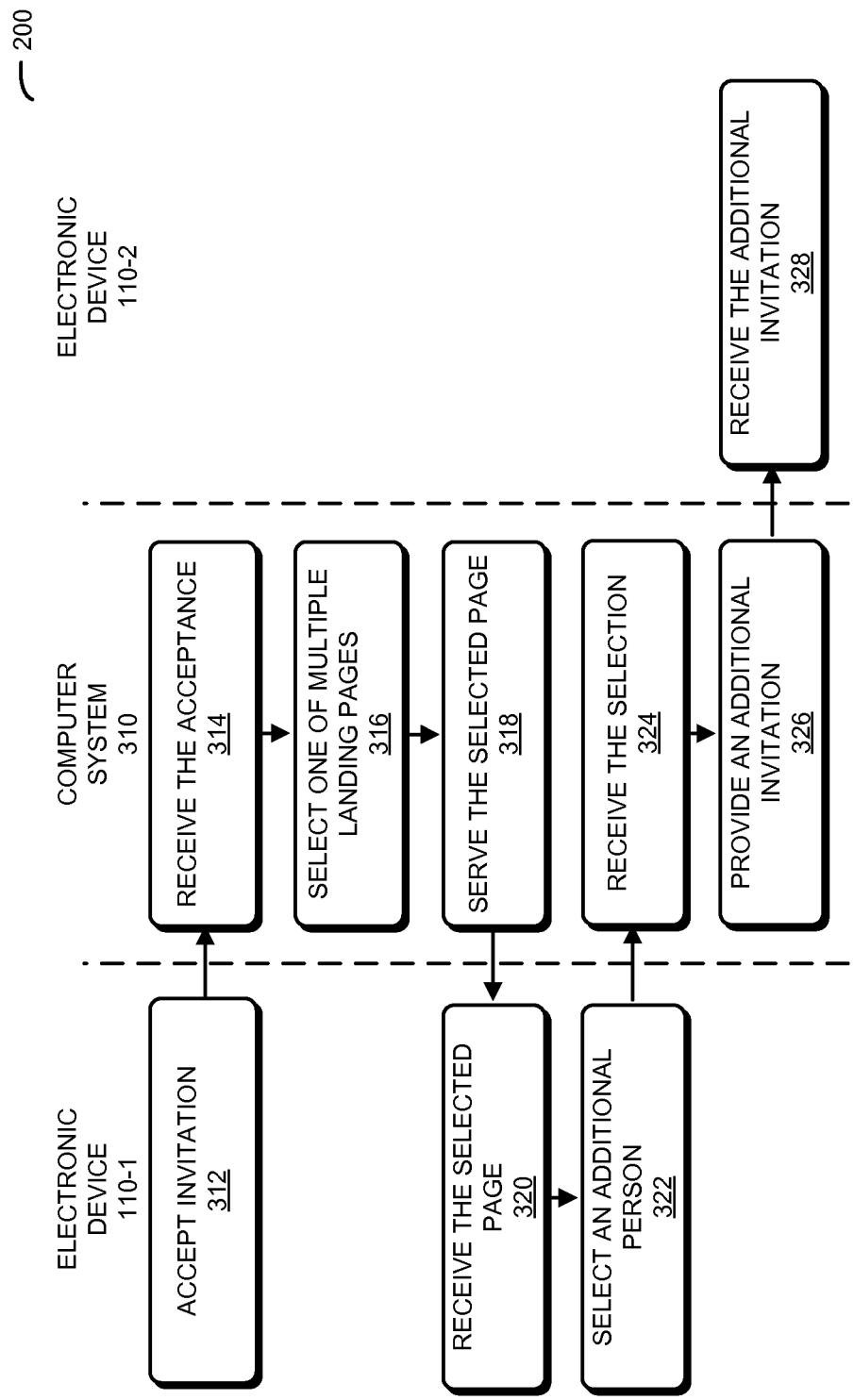
FIG. 3 is a flow chart illustrating the method of FIG. 2 in accordance with an embodiment of the present disclosure.

In an exemplary embodiment, the communication technique is implemented using one or more electronic devices and at least one server (and, more generally, a computer system), which communicate through a network, such as a cellular-telephone network and/or the Internet (e.g., using a client-server architecture). This is illustrated in FIG. 3, which presents a flow chart illustrating method 200 (FIG. 2). During this method, a user of one of electronic devices 110 in FIG. 1 (such as the first user of electronic device 110-1) may accept an invitation (operation 312) to connect with a second user in a network of users of the social network (which may be implemented using computer system 310, which, in turn, may include one or more of the servers and computers in FIG. 1). For example, the first user may activate a link in the invitation or an invitation message (such as an email or a web page) that was previously provided by computer system 310.

After receiving the acceptance (operation 314) of the invitation, computer system 310 may select, based on a history of user activity during a time interval, one of multiple landing pages (operation 316) to serve to the first user in response to activation of the link. As noted previously, the selection may involve computer system 310 determining whether one or more user-experience criteria are met based on the history of user activity (such as page views or impressions, user actions when viewing the pages, etc.) and one or more threshold values, and/or executing a predetermined supervised-learning model that predicts relevance of the multiple pages to the first user based on a user profile of the first user and/or the history of user activity.

Moreover, computer system 310 serves the selected page (operation 318) to electronic device 110-1, which subsequently receives (operation 320) and presents the page to the first user. If the selected page is the in-network page, the user may be presented with one or more possible connections with other users of the network. Alternatively, if the selected page is the out-of-network page, the user may be presented with one or more possible connections with individuals who are outside of or who are not currently members of the network. Note that prior to presenting the out-of-network page, computer system 310 may identify the individuals by importing addresses of one or more individuals who previously communicated with the first user.

In response, the first user of electronic device 110-1 may select an additional person (operation 322) to whom the first user is not connected in the network. Next, computer system 310 receives the selection of the additional person (operation 324).

Furthermore, computer system 310 provides an additional invitation (operation 326) to join the network (if the additional person is not in the network) or to connect with the first user (if the additional person is in the network). Thus, the additional invitation or invitation message (such as another email or another web page) may include a member-to-guest invitation or a member-to-member invitation. Subsequently, another one of electronic devices 110 in FIG. 1 (such as electronic device 110-2) may receive (operation 328) and present the additional invitation to the additional person. This additional invitation may include a link that, when activated by the additional person, connects the additional person to the first user in the network. If the additional person is not currently a member or a user of the network, they may first be asked to enroll in the network (e.g., by setting up a user account and/or a user profile) before they are connected with the first user.

In an exemplary embodiment, the communication technique is used to route or steer the first user through a website associated with the network of users (such as a social network) based on the first user's history of user activity with one or more web pages in the website, the supervised-learning model and/or one or more covariates (such as the features in the first user's user profile in the network).

Figure 4:
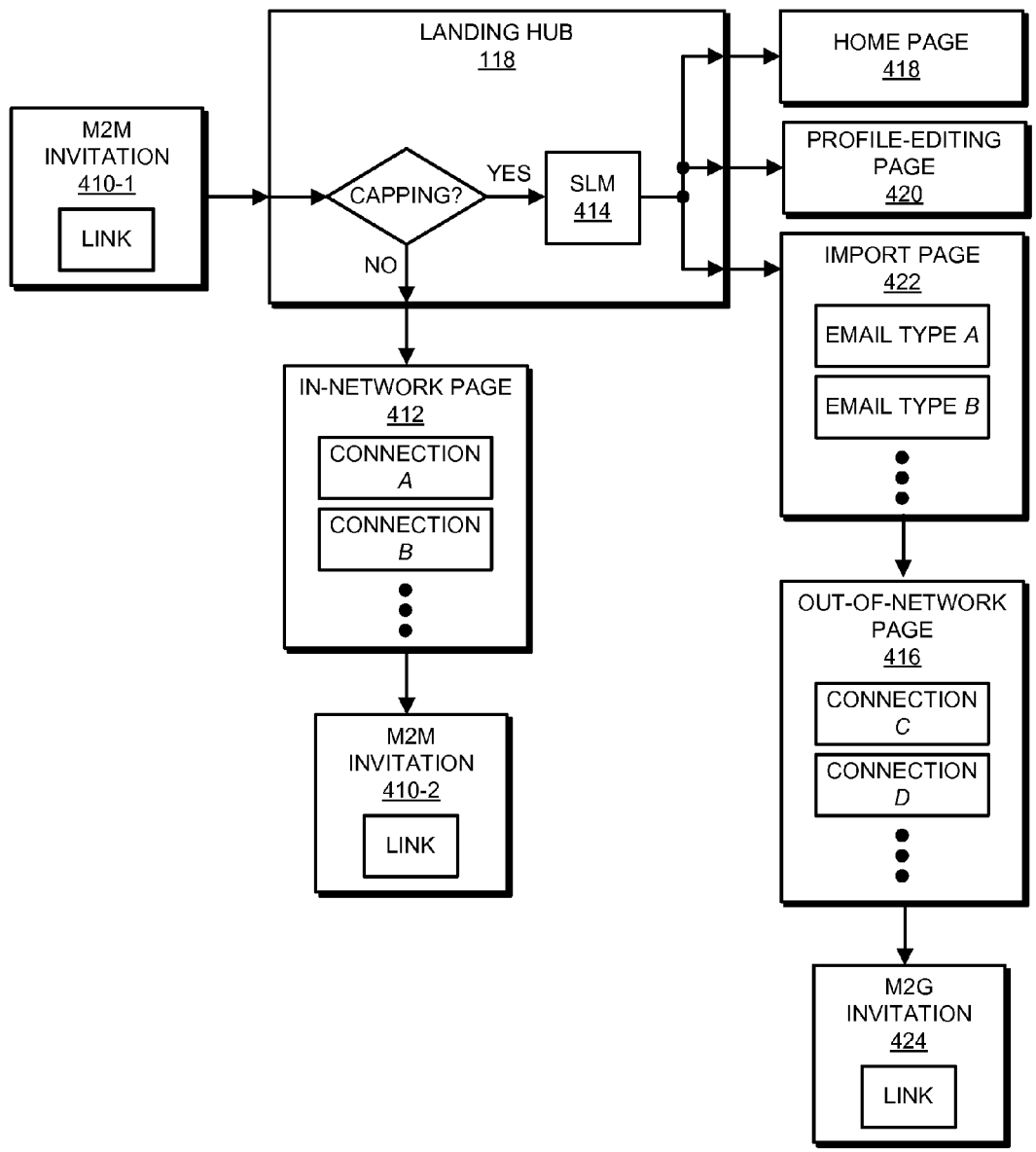
FIG. 4 is a drawing illustrating the method of FIG. 2 in accordance with an embodiment of the present disclosure.

FIG. 4 illustrates an exemplary embodiment of method 200 (FIG. 2). A first user, Fred, may receive a member-to-member (M2M) invitation 410-1 to connect with Steve. If Fred activates a link in M2M invitation 410-1 (thereby accepting the invitation), landing hub 118 receives notification of the activation and assesses a number of impressions or views (which is sometimes referred to as 'impression capping') presented to Fred during a time interval (such as a two-week time interval or 'cooling-off period'). If the number of views is less than a threshold value (such as three views), in-network page 412 (which is sometimes referred to as a 'people you may know' or a PYMK page) may be displayed. When Fred selects one of the possible connections listed in in-network page 412, an additional M2M invitation 410-2 may be sent to the associated user, thereby continuing the process of establishing connections between existing users of the network.

Alternatively, if the number of views exceeds the threshold value, additional user-experience criteria may be assessed using the supervised-learning model or SLM 414 (which is sometimes referred to as 'site-flow optimization') to maximize the relevance. For example, the supervised-learning model may assess the number of user actions, such as whether Fred has previously been served out-of-network page 416 (which is sometimes referred to as an 'address-import page'), possibly within some specified time period, and if yes, may direct Fred to or serve Fred a different page (such as Fred's home page 418 or a profile-editing page 420). Alternatively or additionally, the supervised-learning model may assess variations in user behavior (such as presenting out-of-network page 444 on Tuesdays or Wednesdays, etc.). More generally, the supervised-learning model may use multiple covariates to predict the page that is likely to generate the best user response (in terms of additional invitations).

If out-of-network page 444 is selected, an import page 422 may be presented, and Fred may be asked to select one or more communication protocols (such as different email applications), which are then mined to identify individuals who Fred has communicated with and who are not currently members of the network. Next, out-of-network page 416 is presented. When Fred selects one of the possible connections listed in out-of-network page 416, an additional member-to-guest (M2G) invitation 424 may be sent to the associated individual, thereby continuing the process of inviting new users to join the network.

Thus, the communication technique may provide reinforcement that helps Fred reinforce the expansion of the network (e.g., by maximizing the yield on requests to send member-to-member invitations and member-to-guest invitations). In the process, the communication technique may help increase engagement of the users in the network.

Figure 5:
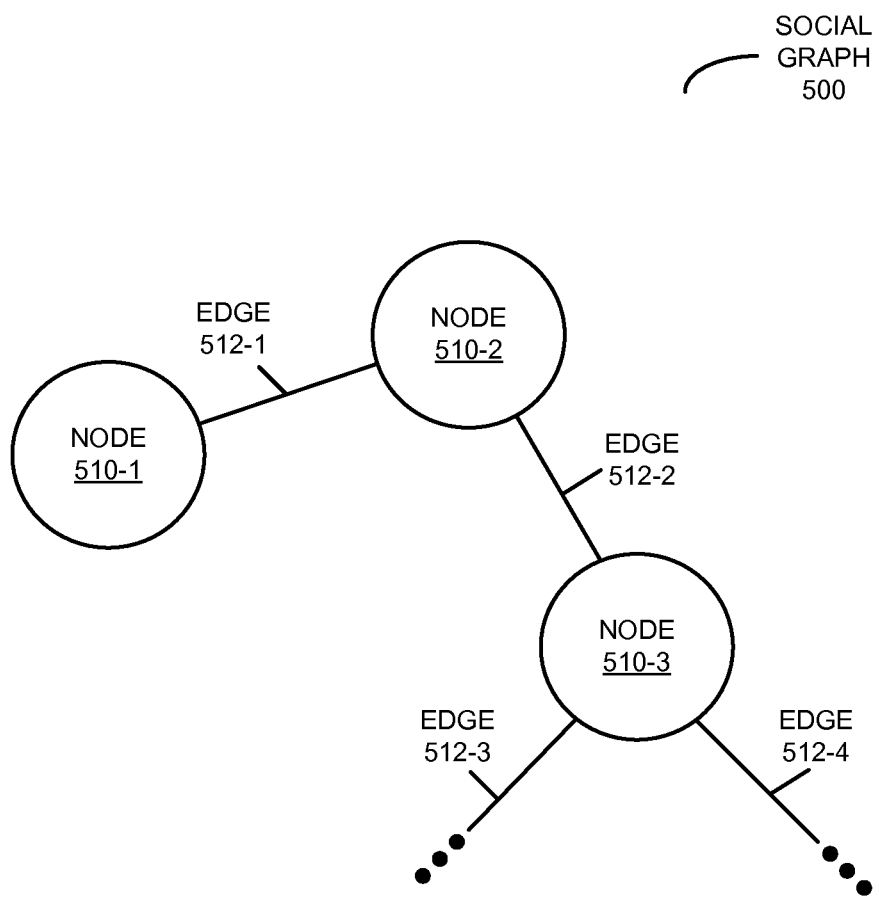
FIG. 5 is a drawing illustrating a social graph in accordance with an embodiment of the present disclosure.

We now further describe the profiles of the users. The profile of a user may, at least in part, specify a social graph or a portion of a social graph. FIG. 5 presents a drawing illustrating a social graph 500. This social graph may represent the connections or interrelationships among nodes 510 (corresponding to entities) using edges 512. In the context of the communication technique, one of nodes 510 (such as node 510-1) may correspond to the user, and the remainder of nodes 510 may correspond to other users (or groups of users) in the social network. Therefore, edges 512 may represent interrelationships among these users, such as companies where they worked, schools they attended, organizations (companies, schools, etc.) that the individuals are (or used to be) associated with, etc.

In general, a given node in social graph 500 may be associated with a wide variety of information that is included in user profiles, including attributes such as: age, gender, geographic location, work industry for a current employer, functional area (e.g., engineering, sales, consulting), seniority in an organization, employer size, schools attended, previous employers, current employer, professional development, interest segments, target groups, additional professional attributes and/or inferred attributes (which may include or be based on user behaviors). Furthermore, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, and/or interest segments for the likes or shares. As noted previously, one or more of these features may be used in the supervised-learning model to select one of the multiple pages.

Figure 6:
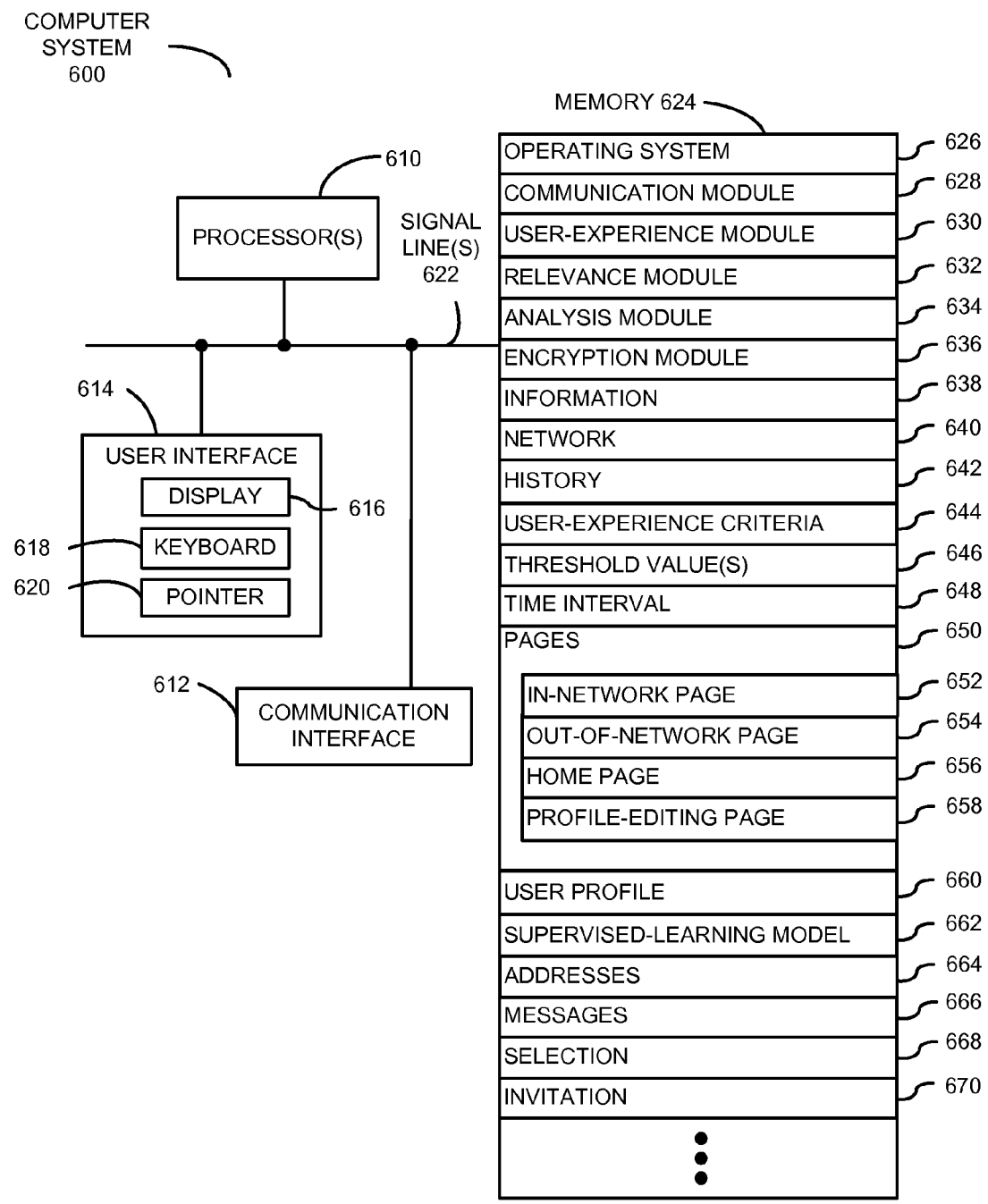
FIG. 6 is a block diagram illustrating a computer system that performs the methods of FIGS. 2-4 in accordance with an embodiment of the present disclosure.

We now describe embodiments of the computer system and its use. FIG. 6 presents a block diagram illustrating a computer system 600 that performs method 200 (FIGS. 2 and 3), such as computer system 310 in FIG. 3. Computer system 600 includes one or more processing units or processors 610, a communication interface 612, a user interface 614, memory 624, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616 (such as a touchscreen), a keyboard 618, and/or a pointer 620 (such as a mouse).

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions)

for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: user-experience module 630 (or a set of instructions), relevance module 632 (or a set of instructions), analysis module 634 (or a set of instructions) and/or encryption module 636 (or a set of instructions). Note that one or more of these program modules (or sets of instructions) may constitute a computer-program mechanism.

During operation of computer system 600, user-experience module 630 receives, via communication interface 612 and communication module 628, information 638 indicating that a user in network 640 of users activated a link in an invitation message connecting the user to another user in network 640. In response, user-experience module 630 may access the user's history 642 of user activity (such as behavior of the user when using network 640) to determine whether or not one or more user-experience criteria 644 are met during time interval 648. This may involve comparing values in history 642 to one or more threshold values 646. Based on this analysis, user-experience module 630 may select one of multiple pages 650 (such as in-network page 652, out-of-network page 654, home page 656, profile-editing page 658) in a website associated with network 640 to provide to the user.

Figure 7:
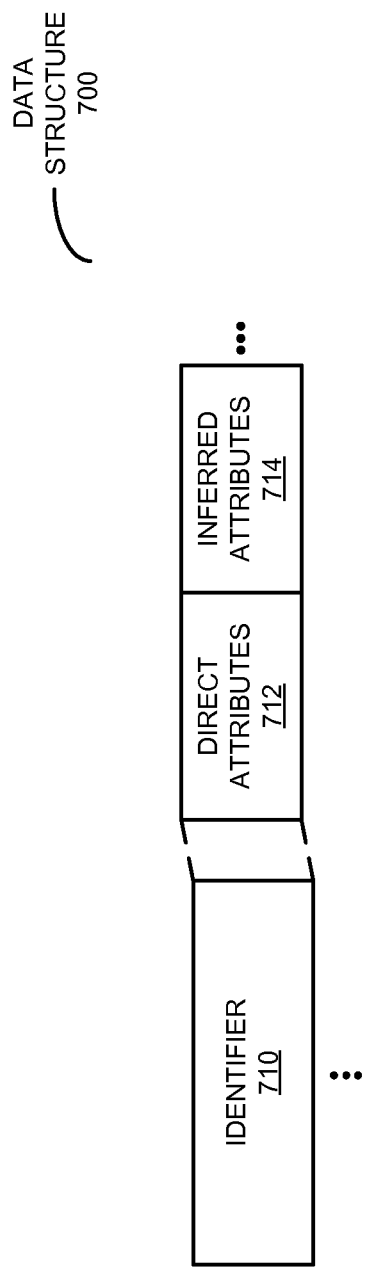
FIG. 7 is a block diagram illustrating a data structure for use in the computer system of FIG. 6 in accordance with an embodiment of the present disclosure.

In addition, relevance module 632 may use features in the user's user profile 660 and a supervised-learning model 662 to assist user-experience module 630 in the selection. In general, user profile 660 may include attributes of the user, including information specified directly by the user and/or information inferred (i.e., gathered indirectly) about the user (which may sometimes be referred to as 'inferred attributes'). This is shown in FIG. 7, which presents a block diagram illustrating a data structure 700 storing user profile 660 (FIG. 6). In particular, data structure 700 may include: an identifier 710 for the user, direct attributes 712 and inferred attributes 714. For example, direct attributes 712 and/or inferred attributes 714 may include: skills, jobs, companies, schools, locations, etc.

Referring back to FIG. 6, user-experience module 630 may then present or serve the selected page to the user via communication module 628 and communication interface 612. If the selected page is in-network page 652, the user may be presented with one or more possible connections with other users of network 640. Alternatively, if the selected page is out-of-network page 654, the user may be presented with one or more possible connections with individuals who are outside of or who are not currently members of network 640. Note that prior to presenting out-of-network page 654, analysis module 634 may identify the individuals by importing addresses 664 of one or more individuals who previously communicated with the first user using messages 666 (such as emails, texts or Short Message Service messages, telephone calls, tweets, etc.).

Next, user-experience module 630 may receive, via communication interface 612 and communication module 628, a selection 668 by the user of a person to whom the user is not connected in network 640. In response, user-experience module 630 may provide an additional invitation 670 to the person to join network 640 (if the person is not in network 640) or to connect with the first user via communication module 628 and communication interface 612 (if the person is a member of network 640).

Because information in computer system 600 may be sensitive in nature, in some embodiments at least some of the data stored in memory 624 and/or at least some of the data communicated using communication module 628 is encrypted using encryption module 636.

Instructions in the various modules in memory 624 may be implemented in a high-level procedural language, an object-oriented programming language, and/or in an assembly or machine language. Note that the programming language may be compiled or interpreted, e.g., configurable or configured, to be executed by the one or more processors.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 is implemented in one or more application-specific integrated circuits (ASICs) and/or one or more digital signal processors (DSPs).

Computer systems (such as computer system 600), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1), computer system 600 and/or data structure 700 (FIG. 7) may include fewer components or additional components. Moreover, two or more components may be combined into a single component, and/or a position of one or more components may be changed. In some embodiments, the functionality of system 100 (FIG. 1) and/or computer system 600 may be implemented more in hardware and less in software, or less in hardware and more in software, as is known in the art.

While a social network has been used as an illustration in the preceding embodiments, more generally the communication technique may be used to route a user to an appropriate landing page or determine which web pages in a website to serve to the user from a wide variety of websites, including websites that are associated with other types of groups of people. For example, the website may be associated with a group of people who are loosely affiliated with a website (such as viewers or users of the web site), and which may include people who do not have predefined user accounts. Thus, the in-network and out-of-network connections may be defined less stringently, such as people who have previously communicated with each other (or not) using a communication protocol, or people who have previously viewed each other's home pages (or not), etc. In this way, the communication technique may be used to expand interactions among relevant or potentially interesting people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for providing an invitation message, the method comprising:
    receiving, from an electronic device operated by a first user, activation of a link in an invitation delivered to the first user, wherein the invitation is an invitation to connect with a second user in a network of users of the computer system;
    operating the computer system to:
        identify a selected page from among multiple pages to serve to the first user in response to activation of the link, the identifying comprising:
            when a history of user activity of the first user during a time interval indicates that presenting an in-network page offering invitations to other users within the network to connect with the first user is not likely to be repetitive with regard to one or more previous presentations of the in-network page to the user, identifying, as the selected page, the in-network page; and
            when the history of user activity indicates that presenting the in-network page is likely to be repetitive, executing a supervised-learning model that predicts relevance to the first user of other pages among the multiple pages based on the history of user activity and a profile of the first user, and identifying, as the selected page, an other page predicted to be the most relevant to the first user by the supervised learning model; and
        serve the selected page to the electronic device;
    receiving from the electronic device selection of an additional person to whom the first user is not connected in the network; and
    providing to an electronic device associated with the additional person an additional invitation to join the network, if the additional person is not in the network, or to connect with the first user.

2. The method of claim 1, wherein the history of user activity of the first user includes at least one of:
    a number of views of each of the multiple pages;
    a number of user actions with the multiple pages; and
    variation in user behavior during the time interval.

3. The method of claim 2, wherein the method further comprises:
    for each of the multiple pages, comparing the number of views of the page to a corresponding view threshold value;
    for one or more of the multiple pages, comparing the number of user actions with the one or more pages to a corresponding action threshold value; and
    comparing the variation in the behavior of the first user to a behavior threshold value.

4. The method of claim 1, wherein the multiple pages include an out-of-network page soliciting identification of individuals outside of the network of users to invite to join the network.

5. The method of claim 4, wherein the multiple pages further include: a home page for the user, and a profile-editing page for the user.

6. The method of claim 4, wherein, prior to serving the out-of-network page, the method further comprises importing addresses of one or more individuals who communicated with the first user using a communication protocol.

7. The method of claim 6, wherein the communication protocol includes one of: an email, a Short Message Service message, and a telephone communication protocol.

8. An apparatus, comprising:
    one or more processors;
    memory; and
    a program module, wherein the program module is stored in the memory and, during operation of the apparatus, is executed by the one or more processors to provide an invitation message, the program module including:
        instructions for receiving, from an electronic device operated by a first user, activation of a link in an invitation delivered to the first user, wherein the invitation is an invitation to connect with a second user in a network of users of the apparatus;
        instructions for identifying a selected page from among multiple pages to serve to the first user in response to activation of the link, the identifying comprising:
            when a history of user activity of the first user during a time interval indicates that presenting an in-network page offering invitations to other users within the network to connect with the first user is not likely to be repetitive with regard to one or more previous presentations of the in-network page to the user, identifying, as the selected page, the in-network page; and
            when the history of user activity indicates that presenting the in-network page is likely to be repetitive, executing a supervised-learning model that predicts relevance to the first user of other pages among the multiple pages based on the history of user activity and a profile of the first user, and identifying, as the selected page, an other page predicted to be the most relevant to the first user by the supervised learning model;
        instructions for serving the selected page to the electronic device;
        instructions for receiving from the electronic device selection of an additional person to whom the first user is not connected in the network; and
        instructions for providing to an electronic device associated with the additional person an additional invitation to join the network, if the additional person is not in the network, or to connect with the first user.

9. The apparatus of claim 8, wherein the history of user activity of the first user includes at least one of:
a number of views of each of the multiple pages;
a number of user actions with the multiple pages; and
variation in user behavior during the time interval.

10. The apparatus of claim 9, wherein the program module further comprises:
for each of the multiple pages, instructions for comparing the number of views of the page to a corresponding view threshold value;
for one or more of the multiple pages, instructions for comparing the number of user actions with the one or more pages to a corresponding action threshold value; and
instructions for comparing the variation in the behavior of the first user to a behavior threshold value.

11. The apparatus of claim 8, wherein the multiple pages include an out-of-network page soliciting identification of individuals outside of the network of users to invite to join the network.

12. The apparatus of claim 11, wherein the multiple pages further include: a home page for the user, and a profile-editing page for the user.

13. The apparatus of claim 11, wherein, prior to the instructions for serving the out-of-network page, the program module further comprises instructions for importing addresses of one or more individuals who communicated with the first user using a communication protocol.

14. The apparatus of claim 13, wherein the communication protocol includes one of: an email, a Short Message Service message, and a telephone communication protocol.

15. A system, comprising:
an interface module configured to receive, from an electronic device operated by a first user, activation of a link in an invitation delivered to the first user, wherein the invitation is an invitation to connect with a second user in a network of users of the system; and
a processing module, coupled to the interface module, wherein the processing module is configured to:
identify a selected page from among multiple pages to serve to the first user in response to activation of the link, the identifying comprising:
when a history of user activity of the first user during a time interval indicates that presenting an in-network page offering invitations to other users within the network to connect with the first user is not likely to be repetitive with regard to one or more previous presentations of the in-network page to the user, identifying, as the selected page, the in-network page; and
when the history of user activity indicates that presenting the in-network page is likely to be repetitive, executing a supervised-learning model that predicts relevance to the first user of other pages among the multiple pages based on the history of user activity and a profile of the first user, and identifying, as the selected page, an other page predicted to be the most relevant to the first user by the supervised learning model; and
serve the selected page to the electronic device, wherein the interface module is further configured to:
receive from the electronic device selection of an additional person to whom the first user is not connected in the network; and
provide to an electronic device associated with the additional person an additional invitation to join the network, if the additional person is not in the network, or to connect with the first user.

16. The system of claim 15, wherein the history of user activity of the first user includes at least one of:
a number of views of each of the multiple pages;
a number of user actions with the multiple pages; and
variation in user behavior during the time interval.

17. The system of claim 16, wherein the processing module is further configured to:
for each of the multiple pages, compare the number of views of the page to a corresponding view threshold value;
for one or more of the multiple pages, compare the number of user actions with the one or more pages to a corresponding action threshold value; and
compare the variation in the behavior of the first user to a behavior threshold value.

* * * * *